United States Patent
Nakamura et al.

(10) Patent No.: US 6,941,074 B2
(45) Date of Patent: Sep. 6, 2005

(54) BIDIRECTIONALLY TRANSMITTABLE OPTICAL WAVELENGTH DIVISION MULTIPLEXED TRANSMISSION SYSTEM

(75) Inventors: Kentaro Nakamura, Kawasaki (JP); Takafumi Terahara, Kawasaki (JP); Junichi Kumasako, Kawasaki (JP); Rainer Hainberger, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 604 days.

(21) Appl. No.: 09/800,891

(22) Filed: Mar. 8, 2001

(65) Prior Publication Data
US 2002/0051267 A1 May 2, 2002

(30) Foreign Application Priority Data
Oct. 20, 2000 (JP) .................................. 2000-321666

(51) Int. Cl.$^7$ .................... H04J 14/02; H04B 10/08; H04B 10/00; H04B 10/02; H04B 10/12
(52) U.S. Cl. ..................... 398/92; 398/37; 398/97; 398/157; 398/160; 398/173; 359/341.2; 359/341.3
(58) Field of Search .................... 398/92, 97, 37, 398/157, 160, 173, 67, 72, 42; 359/341.2, 341.3, 341.33

(56) References Cited

U.S. PATENT DOCUMENTS

| | | | |
|---|---|---|---|
| 4,373,782 A | * 2/1983 | Thelen | 398/79 |
| 4,699,452 A | * 10/1987 | Mollenauer et al. | 398/157 |
| 5,365,368 A | * 11/1994 | Hsu et al. | 359/341.2 |
| 5,652,675 A | 7/1997 | Shibuya | 359/341 |
| 6,130,775 A | * 10/2000 | Yang | 359/341.2 |
| 6,342,965 B1 | * 1/2002 | Kinoshita | 359/334 |
| 6,751,414 B1 | * 6/2004 | Davies et al. | 398/41 |

FOREIGN PATENT DOCUMENTS

| | | |
|---|---|---|
| EP | 1 022870 A2 | 7/2000 |
| JP | A-6-222412 | 8/1994 |
| JP | A-6-224506 | 8/1994 |
| WO | WO 95/15625 | 6/1995 |

OTHER PUBLICATIONS

European Search Report dated Feb. 4, 2004 for corresponding EP Application No. 01105407.

* cited by examiner

*Primary Examiner*—M. R. Sedighian
(74) *Attorney, Agent, or Firm*—Staas & Halsey LLP

(57) ABSTRACT

Different bands (C-band and L-band) are allotted respectively to an upstream optical signal and a downstream optical signal. In a transmission-path optical fiber for Raman amplification, the C-band optical signal is amplified by pumping light from a C-band pumping light source, and the L-band optical signal is amplified by pumping light from an L-band pumping light source. As a result of this configuration, the optical signals are Raman-amplified through backward pumping in both upstream and downstream directions, whereby negative effects, which could be exerted on the optical signals by forward pumping, can be avoided.

8 Claims, 7 Drawing Sheets

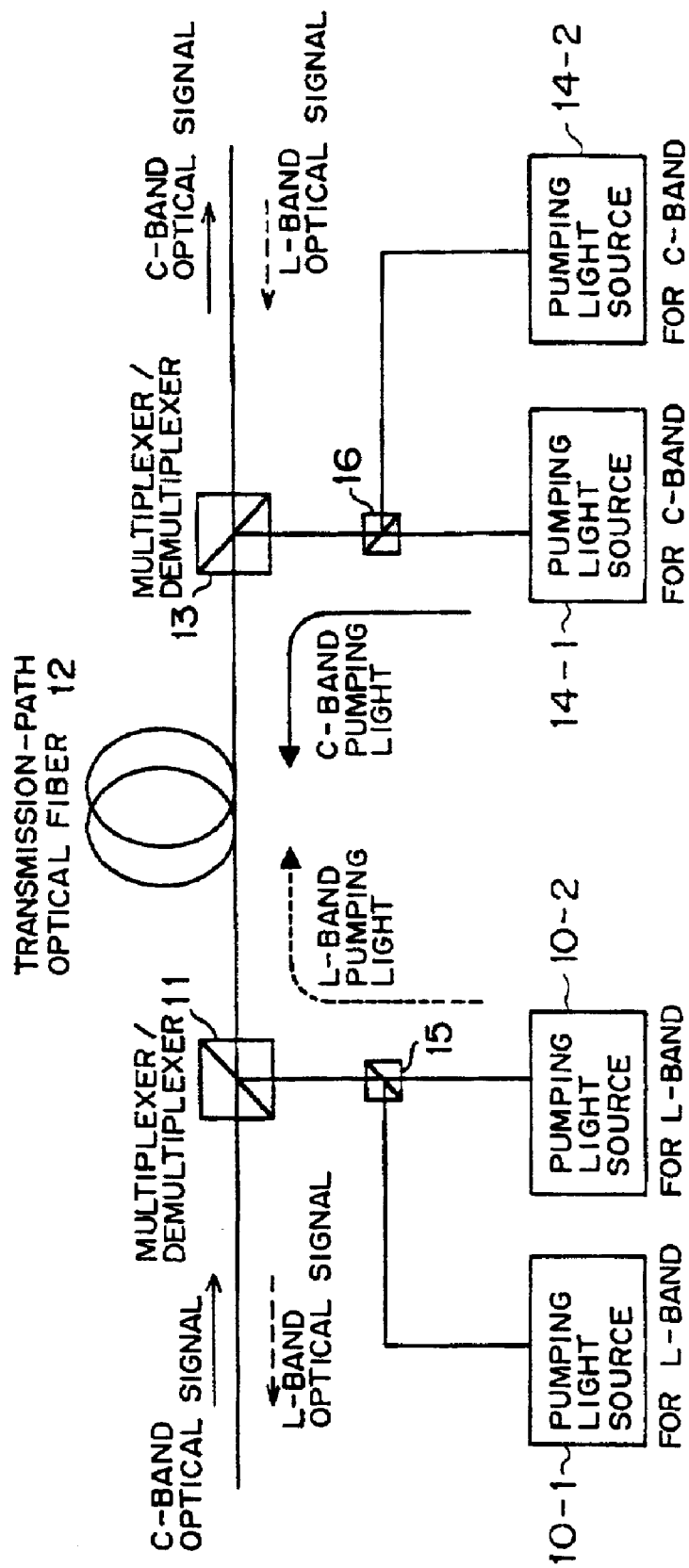
F I G. 4

BIDIRECTIONALLY TRANSMITTABLE OPTICAL WAVELENGTH DIVISION MULTIPLEXED TRANSMISSION SYSTEM

BACKGROUND OF THE INVENTION

1. Field of the Invention

The present invention relates to bidirectionally transmittable optical wavelength division multiplexed (WDM) transmission systems.

2. Description of the Related Art

In conventional bidirectional WDM transmission systems, optical signals are optically amplified by the following methods. One method is to perform bidirectional WDM transmission in full duplex using two optical fibers. The other is, as disclosed in, for example, Japanese Patent Publication Laid-Open No. 11-284576, to separate an optical signal traveling through a single optical fiber into a plurality of separated optical signals respectively having different wavelength bands using WDM couplers or circulators, and thereafter to perform optical amplification using discrete amplifiers. Further, Japanese Patent Publication Laid-Open No. 6-222412 discloses, in its latter part, a method of carrying out bidirectional pumping using distributed amplifiers for upstream and downstream optical signals each having the same wavelength band. That is, when distributed amplification is applied to bidirectional WDM transmission using a single fiber, pumping light sources are disposed at both ends of the transmission path, whereby the optical signals are pumped in both forward and backward directions.

The "distributed amplifier" herein means a device that utilizes the characteristics of a transmission path itself and thus amplifies optical signals while transmitting the optical signals therethrough. A distributed Raman amplification is an example. On the other hand, the "discrete amplifier" means a device that amplifies optical signals using an amplifying medium independent of a transmission path. An erbium-doped fiber amplifier (EDFA) is an example of such a medium.

For long-distance WDM transmission systems, it is known that the distributed amplifiers are effective in increasing optical repeater spacing and improving optical SNR, i.e., increasing transmission distance, as discussed, for example, by T. Terahara et al. in "128×10.66 Gbit/s Transmission over 840-km Standard SMF with 140-km Optical Repeater Spacing (30.4-dB loss) Employing Bidirectional Distributed Raman Amplification" (OFC'00, PD28, 2000).

However, to use distributed amplifiers in two-way communications, the following problem must be considered. A distributed amplifier can amplify an optical signal by two techniques: forward pumping shown in FIG. 1 in which pumping light is supplied codirectionally with the optical signal for pumping, and backward pumping shown in FIG. 2 in which pumping light is supplied counter-directionally to the optical signal. Of these two amplifying techniques, forward pumping is known to cause interference between the optical signal and the pumping light since the optical signal and the pumping light travel in the same direction, and this degrades transmission quality, as discussed in the paper prepared by Yasuhiro Aoki, Shunji Kishida, and Kunihiko Washio ("Stable cw backward Raman amplification in optical fibers by stimulated Brillouin scattering suppression", Applied Optics, Vol. 25, No. 7, p. 1056, 1986).

This paper also indicates that backward pumping gives a solution to the problem of degraded transmission quality.

Further, forward pumping causes the intensity of pumping light to exceed that of an incident optical signal in a transmission-path optical fiber, and would hence be affected largely by nonlinear optical effects, depending on the intensity of the incident optical signal.

Still further, the distributed amplifier could produce gain differences among wavelengths (channels) multiplexed into a single wavelength band.

Even further, in the event that gain provided by the distributed amplifiers is insufficient, the system requires use of discrete amplifiers in addition to the distributed amplifiers for continuous transmission.

SUMMARY OF THE INVENTION

An object of the present invention is, therefore, to provide a bidirectionally communicatable long-distance optical wavelength division multiplexed transmission system in which degradation in transmission quality is suppressed by using distributed amplifiers in a single optical fiber.

To achieve the above object, the invention provides an optical wavelength division multiplexed transmission system in a bidirectional optical wavelength division multiplexed transmission system for transmitting an upstream optical signal and a downstream optical signal within a single line, the optical wavelength division multiplexed transmission system comprising transmission means for setting the upstream optical signal to a first band and transmitting the upstream optical signal set to the first band, and setting the downstream optical signal to a second band which is different from the first band and transmitting the downstream optical signal set to the second band, and distributed amplifier means having a first pumping light source for pumping only the upstream optical signal set to the first band, and a second pumping light source for pumping only the downstream optical signal set to the second band.

According to the invention, the optical wavelength division multiplexed transmission system that transmits optical signals bidirectionally along a single optical fiber can amplify the optical signals using distributed amplifiers without degrading their transmission quality.

BRIEF DESCRIPTION OF THE DRAWINGS

FIG. 4 is a diagram showing a second embodiment of the invention;

DESCRIPTION OF THE PREFERRED EMBODIMENTS

In each of the bidirectional optical wavelength division multiplexed (WDM) transmission systems according to embodiments of the present invention, different wavelength bands are allotted to optical signals propagating in upstream and downstream directions, respectively, and a distributed amplifier is used for each wavelength band.

Optical signals having two different wavelength bands are allotted respectively to upstream and downstream transmission paths, and distributed amplifiers that amplify the respective wavelength bands are arranged such that pumping light used by each distributed amplifier counterpropagates with respect to the corresponding optical signal, whereby only backward pumping is performed for each wavelength band. As a result of this arrangement, a bidirectional optical WDM transmission system can be implemented, which is free from forward pumping-derived degradation in transmission quality.

Further, in each of the embodiments of the invention, two or more pumping light sources are employed for the distributed amplifier corresponding to each wavelength band so as to optimize wavelengths from the sources and their intensities.

By employing two or more pumping light sources in order to optimize the wavelengths and their intensities, a bidirectional optical WDM transmission system can be implemented, which produces less distributed amplifier-induced gain differences among wavelengths (channels) combined into a single wavelength band.

Still further, amplifying nodes are arranged at one or both ends of the system. At each of such one or both amplifying nodes, discrete amplifiers corresponding to the respective wavelength bands are interposed between two wavelength-selective multiplexers/demultiplexers in such a manner that the discrete amplifiers face opposite to each other. As an alternative, at each similarly arranged amplifying node, oppositely facing discrete amplifiers corresponding to the respective wavelength bands may be interposed between two multilayer thin film filters. As a further alternative, at each similarly arranged amplifying node, oppositely facing discrete amplifiers corresponding to the respective wavelength bands may be interposed between two circulators.

Figure 1:
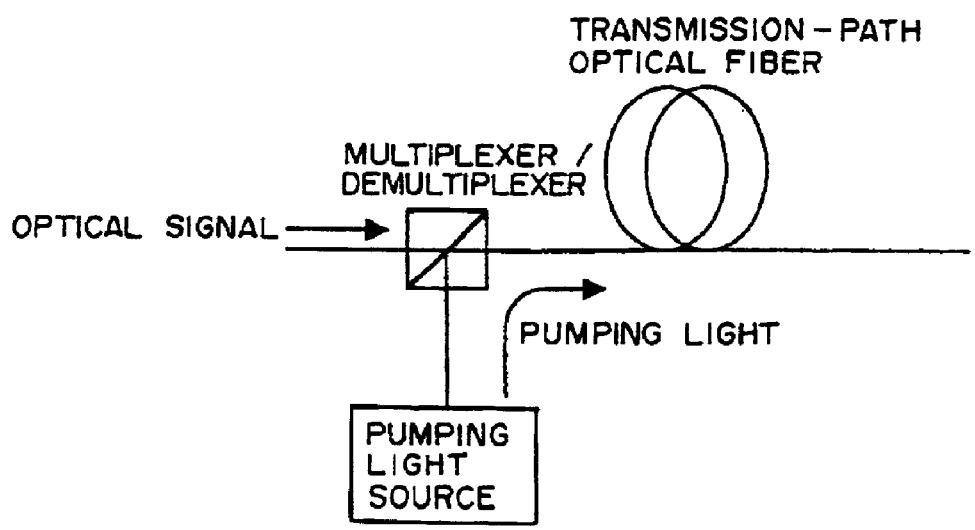
FIG. 1 is a diagram illustrating forward pumping.
Figure 2:
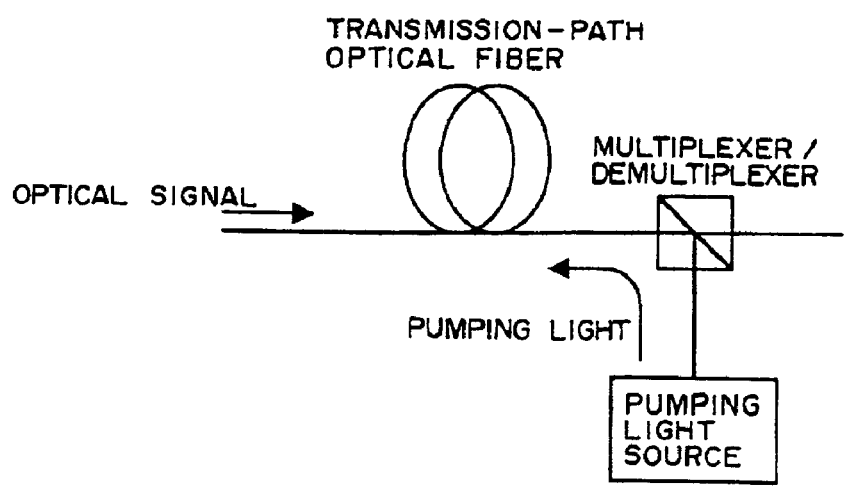
FIG. 2 is a diagram illustrating backward pumping.
Figure 3:
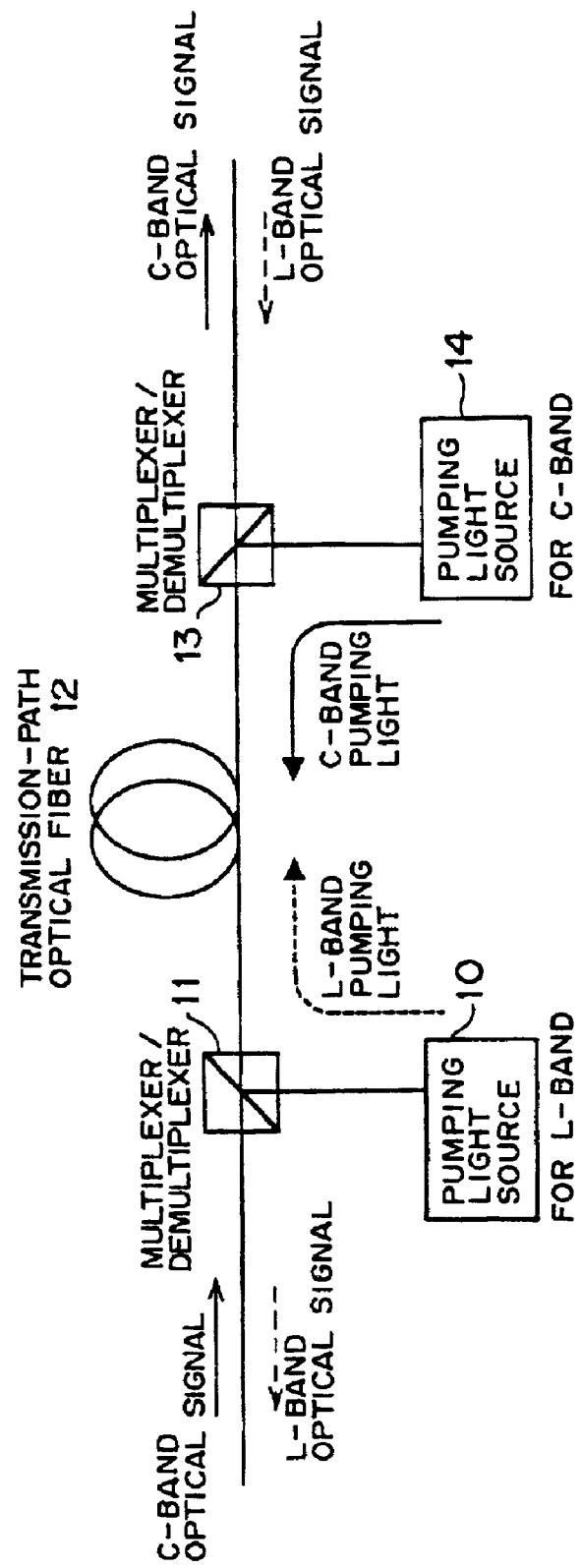
FIG. 3 is a diagram illustrating a first embodiment of the invention.

When the amplifying nodes are located as mentioned above, each discrete amplifier can be used exclusively for the corresponding wavelength band, whereby a satisfactory long-distance bidirectional optical WDM transmission system can be implemented even if the distributed amplifiers provide insufficient gain FIG. 3 is a diagram illustrating a first embodiment of the invention.

Wavelength bands used are a C-band and an L-band, to which upstream and downstream paths are allotted, respectively. It is supposed that the C-band has a band of wavelengths ranging from 1529.55 nm to 1563.86 nm, and that the L band has a band of wavelengths ranging from 1567.95 nm to 1604.03 nm. Further, the wavelength of pumping light for distributed amplification of the C-band is in the 1435–1445 nm range, and the same wavelength for distributed amplification of the L-band is in the 1475–1485 nm range.

Although L-band pumping light is combined with the C-band optical signal in a transmission-path optical fiber codirectionally with the C-band signal (in the upstream direction), the C-band signal is not affected by the L-band pumping light, because the C-band signal contains wavelengths for pumping which are different from the wavelength of the L-band pumping light, and hence amplified only through backward pumping implemented by a C-band distributed Raman pumping light source for continued transmission. The L-band signal is similarly amplified only through backward pumping implemented by an L-band distributed Raman pumping light source along the transmission-path optical fiber for further transmission in the downstream direction.

That is, the C-band optical signal enters, as viewed from the left in FIG. 3, into a multiplexer/demultiplexer 11 where it is combined with the L-band pumping light incident from an L-band pumping light source 10. Then, both the C-band optical signal and the L-band pumping light enter a transmission-path optical fiber 12 together. Since the L-band pumping light is not set so as to pump the C-band optical signal, the C-band optical signal is not pumped by the L-band pumping light. When a Raman amplifier is used, the optical signals are amplified utilizing Raman scattering which is a nonlinear effect along the transmission-path optical fiber 12. In this case, each optical signal for amplification is required to have wavelengths longer by approximately 100 nm than the wavelength of the corresponding pumping light. Most types of transmission-path optical fibers 12 generally meet this wavelength requirement. Therefore, the C-band optical signal is not amplified by the L-band pumping light, unless the C-band optical signal is in a band of wavelengths longer by approximately 100 nm than the wavelength of the L-band pumping light.

On the other hand, C-band pumping light from a C-band pumping light source 14 enters first a multiplexer/demultiplexer 13 and then the transmission-path optical fiber 12, while counterpropagating with respect to the C-band optical signal. The C-band pumping light is set to a wavelength shorter by approximately 100 nm than the wavelengths of the C-band optical signal. Therefore, the C-band optical signal is amplified while receiving energy from the C-band pumping light based on the Raman scattering effect. The C-band optical signal and the C-band pumping light are in a backward pumping relationship with each other. The C-band optical signal amplified in this way exits from the optical fiber 12 via the multiplexer/demultiplexer 13.

Similarly, the L-band optical signal and the C-band pumping light are combined by the multiplexer/demultiplexer 13. The L-band optical signal is set so as not to be in a band of wavelengths longer by approximately 100 nm than the wavelength of the C-band pumping light, and hence is not pumped by the C-band pumping light. On the other hand, the L-band pumping light entering the transmission-path optical fiber 12 via the multiplexer/demultiplexer 11 has a wavelength shorter by approximately 100 nm than the wavelengths belonging to the wavelength band of the corresponding L-band optical signal entering the same fiber 12 from the multiplexer/demultiplexer 13, thereby amplifying the L-band optical signal through the Raman scattering effect. The L-band pumping light and the L-band optical signal have a likewise backward pumping relationship with each other.

FIG. 4 is a diagram showing a second embodiment of the invention.

In the configuration shown in FIG. 4, only two more pumping light sources are added to the configuration shown in FIG. 3. Therefore, in FIG. 4, the same components as those of FIG. 3 are designated by the same reference numerals.

The wavelength of pumping light for amplifying a C-band optical signal using a distributed amplifier is selected from 1435 nm to 1445 nm, and the wavelength of pumping light for amplifying an L-band optical signal using a distributed amplifier is selected from 1475 nm to 1485 nm. Each selected wavelength is optimized together with its intensity, through observation of the gain differences of the corresponding received optical signal.

That is, an optical signal to be amplified by pumping light contains a band of wavelengths longer by about 100 nm than the wavelength of the pumping light as described above. Thus, in the case where two pumping light sources are used as shown in FIG. 4, for example, it should be arranged such that each pumping light source is assigned to amplify a half portion of an optical signal, which is a WDM optical signal, in such a way that the lower-half wavelength band of the optical signal is amplified by pumping light from one of the two pumping light sources, and that its upper-half wavelength band of the optical signal is amplified by pumping light from the other pumping light source. With specific reference to FIG. 4, a C-band pumping light source 14-1 is responsible for amplifying the lower-half wavelengths of the C-band optical signal, whereas a C-band pumping light source 14-2 is responsible for amplifying the upper-half wavelengths, for example. Thus, if a gain difference exists between the upper half and lower half of the C-band optical signal, the intensities of the wavelengths from both the C-band pumping light sources 14-1 and 14-2 are properly adjusted, whereby such a gain difference can be reduced, i.e., a flattened gain profile can be obtained during amplification.

Similarly, the L-band optical signal is divided into two wavelength bands, upper and lower, and an arrangement is made such that an L-band pumping light source 10-1 amplifies the upper band of the L-band optical signal and that an L-band pumping light source 10-2 amplifies its lower band, for example.

Beams of pumping light from the L-band pumping light sources 10-1 and 10-2 are combined together by a coupler 15, and then supplied to the multiplexer/demultiplexer 11 for further transmission along the transmission-path optical fiber 12. Similarly, beams of pumping light from the C-band pumping light sources 14-1 and 14-2 are combined together by a coupler 16, and then supplied to the multiplexer/demultiplexer 13 for subsequent transmission through the same fiber 12.

Further, although two sources of pumping light are prepared for each of the C-and L-bands in the configuration shown in FIG. 4, the number of pumping light sources is not necessarily limited to two, but may be three or four. A larger number of pumping light sources would enable the user to more finely adjust gain differences in Raman amplification, provided that the wavelength of pumping light from each pumping light source must be selected in consideration of the fact that the wavelengths of an optical signal to be amplified by the pumping light should be longer by about 100 nm than the wavelength of the pumping light.

Figure 5:
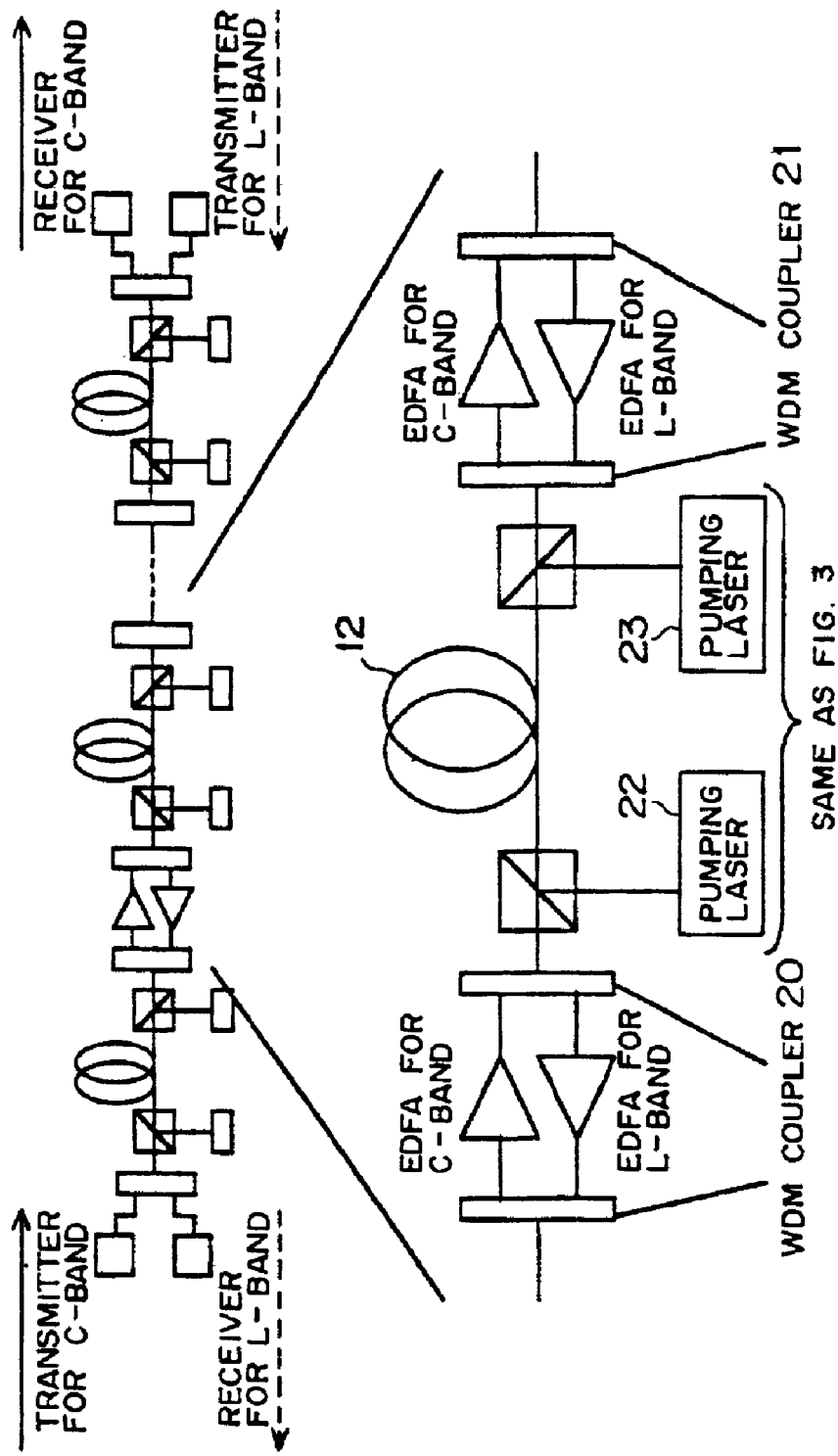
FIG. 5 is a diagram showing a third embodiment of the invention.

FIG. 5 is a diagram showing a third embodiment of the invention.

It is assumed in FIG. 5 that a C-band optical signal is transmitted in the direction of the solid arrow and that an L-band optical signal is transmitted in the direction of the dotted arrow. Let the C-band be taken as an example. A C-band optical signal from a C-band transmitter is separated from an L-band optical signal by a WDM coupler 20 (or a wavelength-selective multiplexer/demultiplexer), and then amplified by a C-band EDFA and combined by the WDM coupler 20 again with the L-band optical signal. The combined optical signals enter the transmission-path optical fiber 12, where the same signals are amplified by Raman amplifying action. Pumping light used for the amplification of the C-band optical signal is supplied from a pumping laser 23. A WDM coupler 21 thereafter separates the C-band optical signal from the L-band optical signal, and the separated C-band optical signal is then amplified by a C-band EDFA and further combined by the WDM coupler 21 again for continuous transmission to a C-band receiver.

The same applies to the L-band. That is, an L-band optical signal from an L-band transmitter is separated from a C-band optical signal by the WDM coupler 21, and then amplified by an L-band EDFA and combined by the WDM coupler 21 again with the C-band optical signal. In the transmission-path optical fiber 12, the L-band optical signal is amplified by pumping light from a pumping laser 22. The L-band signal thus processed is separated again by the WDM coupler 20, then amplified by an L-band EDFA, and thereafter combined by the WDM coupler 20 for further propagation to an L-band receiver.

Thus, a combination of distributed Raman amplification with EDFAs allows optical signals to be amplified satisfactorily even if the gain of the distributed Raman amplification is insufficient.

Figure 6:
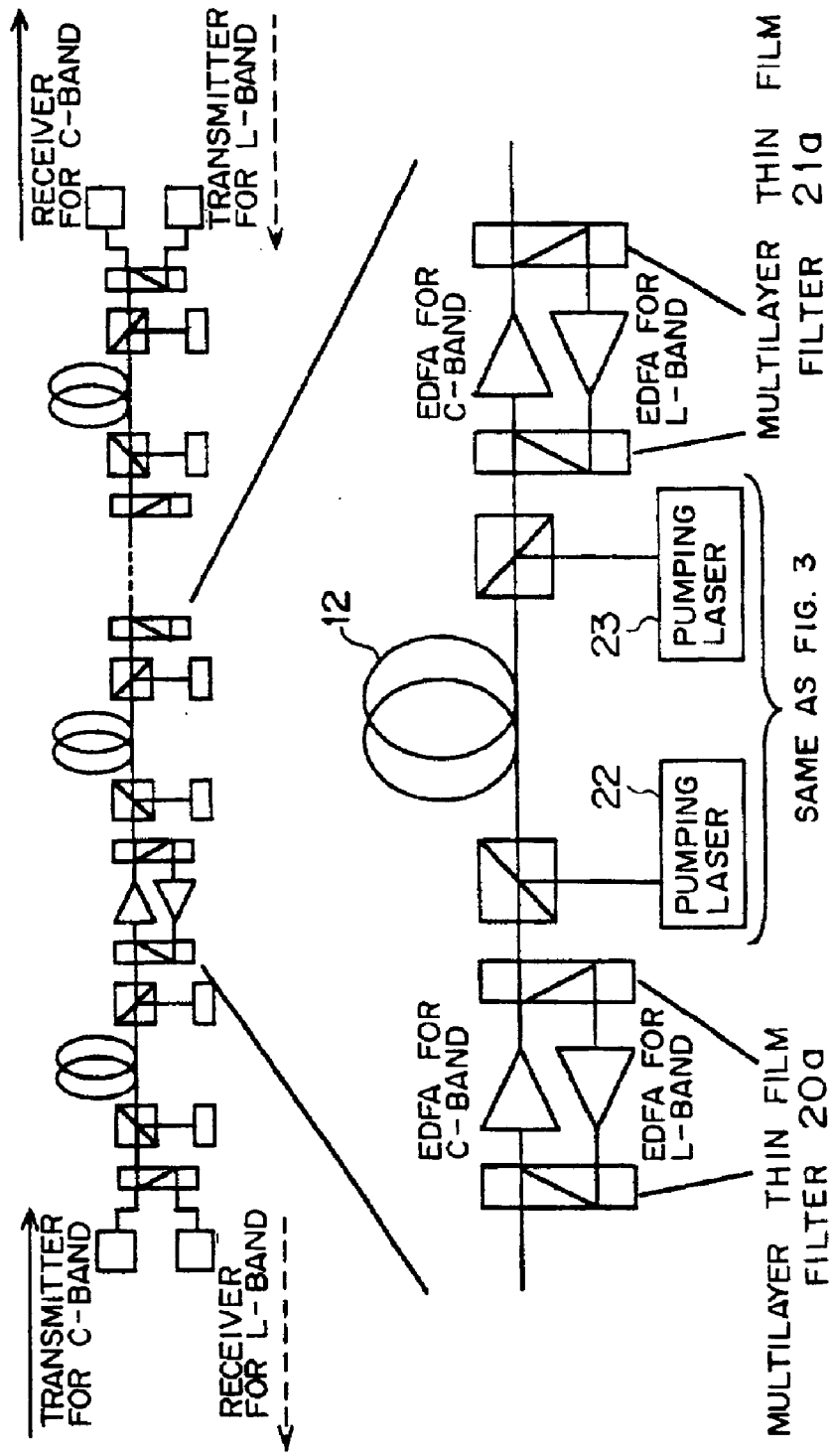
FIG. 6 is a diagram showing a modified example of the embodiment shown in FIG. 5.

FIG. 6 is a diagram showing a modified example of the third embodiment shown in FIG. 5.

FIG. 6 shows a configuration in which multilayer thin film filters are provided in place of the WDM couplers of FIG. 5.

It is assumed also in FIG. 6 that a C-band optical signal is transmitted in the direction of the solid arrow and that an L-band optical signal is transmitted in the direction of the dotted arrow.

Let the C-band be taken as an example. A C-band optical signal from the C-band transmitter is separated from an L-band optical signal by a multilayer thin film filter 20a, then amplified by the C-band EDFA, and thereafter combined by the filter 20a again with the L-band optical signal. The combined optical signals enter the transmission-path optical fiber 12, where the same signals are subjected to distributed amplification through the Raman amplifying action. It is the pumping light from the pumping laser 23 that is used for the amplification of the C-band optical signal. Then, similarly, the resulting C-band optical signal is amplified by a multilayer thin film filter 21a and the C-band EDFA, and thereafter transmitted to be received by the C-band receiver.

The above applies similarly to the L band. That is, an L-band optical signal, which is amplified by a discrete amplifier formed of the multilayer thin film filter 21a and the L-band EDFA, is transmitted along the transmission-path optical fiber 12. In the fiber 12, the L-band optical signal is subjected to Raman amplification by the pumping light from the pumping laser 22. The L-band optical signal thus processed is then amplified by a discrete amplifier formed of the multilayer thin film filter 20a and the L-band EDFA, from which the amplified L-band signal exits to be received by the L-band receiver.

Figure 7:
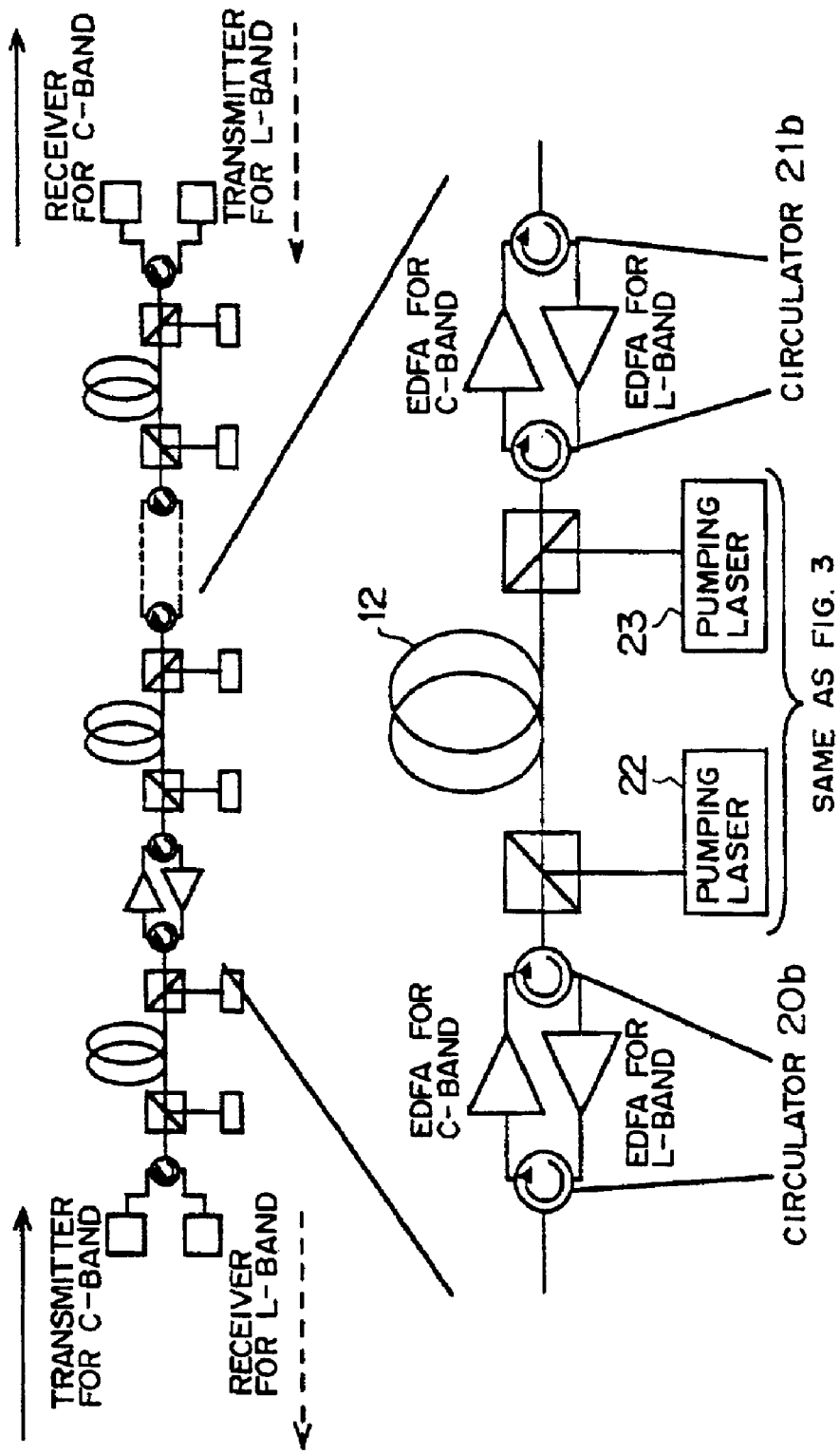
FIG. 7 is a diagram showing another modified example of the embodiment shown in FIG. 5.

FIG. 7 is a diagram showing another modified example of the third embodiment shown in FIG. 5.

FIG. 7 shows a configuration in which circulators are provided in place of the WDM couplers of FIG. 5.

A C-band optical signal is transmitted in the direction of the solid arrow and an L-band optical signal is transmitted in the direction of the dotted arrow.

Taking the C band as an example, a C-band optical signal from the C-band transmitter enters the C-band EDFA via a circulator 20b for amplification. The amplified C-band optical signal then enters the circulator 20b again for continuous propagation over the transmission-path optical fiber 12. In the fiber 12, the C-band optical signal is subjected to distributed amplification by the pumping light from the pumping laser 23 based on the Raman amplifying action. Then, the C-band optical signal thus processed is similarly amplified by the C-band EDFA via a circulator 21b, and transmitted via the circulator 21b to be received by the C-band receiver.

This applies similarly to the L-band. An L-band optical signal from the L-band transmitter is amplified by the L-band EDFA via the circulator 21b, and then enters the transmission-path optical fiber 12 via the circulator 21b. In the optical fiber 12, the L-band optical signal is Raman-amplified by the pumping light from the pumping laser 22, and then enters the circulator 20b. After being amplified by the L-band EDFA, the L-band optical signal exits from the optical fiber 12 via the circulator 20b to be received by the L-band receiver.

In the embodiment shown in FIG. 7, the C-band optical signal is separated from the L-band optical signal using circulators. Since circulators separate optical signals codirectionally with the optical signals, they can reduce the system performance degradation due to variations in wavelength characteristics better than multilayer thin film filters and WDM couplers that separate optical signals by wavelength.

Further, in each of the embodiments shown in FIGS. 5 to 7, optical signals are Raman-amplified in the backward pumping configuration.

According to the invention, a bidirectional optical wavelength division multiplexed transmission system can be constructed using distributed amplifiers, while suppressing the degradation of its transmission quality.

What is claimed is:

1. A bi-directional optical wavelength division multiplexed transmission system for transmitting an upstream optical signal and a downstream optical signal along a same path within a same transmission line, said bi-directional optical wavelength multiplexed transmission system comprising:

a first transmitting unit setting the upstream optical signal to a first band and transmitting the upstream optical signal set to the first band;

a second transmitting unit setting the downstream optical signal to a second band which is different from the first band and transmitting the downstream optical signal set to the second band; and a distributed amplifier unit having a first pumping light source for pumping only the upstream optical signal set to the first band, and a second pumping light source for pumping only the downstream optical signal set to the second band, wherein said first pumping light source amplifies the upstream optical signal set to the first band through backward pumping, and said second pumping light source amplifies the downstream optical signal set to the second band through backward pumping along the same path within the same transmission line.

2. The optical wavelength division multiplexed transmission system according to claim 1, wherein said distributed amplifier unit performs distributed Raman amplification.

3. The optical wavelength division multiplexed transmission system according to claim 1, wherein said first pumping light source and said second pumping light source respectively comprise a plurality of light sources, each of said plurality of light sources having a different wavelength.

4. The optical wavelength division multiplexed transmission system according to claim 1, further comprising:

a wavelength-selective multiplexing/demultiplexing unit, located at one or both ends of said distributed amplifier unit, separating the upstream and downstream optical signals from each other and combining the separated upstream and downstream optical signals with each other; and a discrete amplifier unit amplifying each of the upstream and downstream optical signals respectively set to the first and second bands.

5. The optical wavelength division multiplexed transmission system according to claim 1, further comprising:

a multilayer thin film filter unit, located at one or both ends of said distributed amplifier unit, separating the upstream and downstream optical signals from each other and combining the separated upstream and downstream optical signals with each other; and a discrete amplifier unit amplifying each of the upstream and downstream optical signals respectively set to the first and second bands.

6. The optical wavelength division multiplexed transmission system according to claim 1, further comprising:

a circulator unit, located at one or both ends of said distributed amplifier unit, separating the upstream and downstream optical signals from each other and combining the separated upstream and downstream optical signals with each other; and a discrete amplifier unit amplifying each of the upstream and downstream optical signals respectively set to the first and second bands.

7. A bi-directional optical wavelength division multiplexed transmission system for transmitting an upstream optical signal and a downstream optical signal along a same path within a same transmission line, the bi-directional optical wavelength multiplexed transmission system comprising:

a first transmitting unit setting the upstream optical signal to a first band and transmitting the upstream optical signal set to the first band;

a second transmitting unit setting the downstream optical signal to a second band which is different from the first band and transmitting the downstream optical signal set to the second band; and a distributed amplifier unit having a first pumping light source for pumping the upstream optical signal set to the first band but not the downstream optical signal, and a second pumping light source for pumping the downstream optical signal set to the second band but not the upstream optical signal, wherein said first pumping light source amplifies the upstream optical signal set to the first band through backward pumping, and said second pumping light source amplifies the downstream optical signal set to the second band through backward pumping along the same path within the same transmission line.

8. A bi-directional optical wavelength division multiplexed transmission system for transmitting an upstream optical signal and a downstream optical signal along a same path within a same transmission line, the bi-directional optical wavelength multiplexed transmission system comprising:

means for setting the upstream optical signal to a first band and transmitting the upstream optical signal set to the first band;

means for setting the downstream optical signal to a second band which is different from the first band and transmitting the downstream optical signal set to the second band; and means for pumping the upstream optical signal set to the first band but not the downstream optical signal, and pumping the downstream optical signal set to the second band but not the upstream optical signal, wherein the upstream optical signal set to the first band is amplified through backward pumping, and the downstream optical signal set to the second band is amplified through backward pumping, along the same path within the same transmission line.

* * * * *